United States Patent
Wright et al.

(10) Patent No.: US 6,857,550 B2
(45) Date of Patent: Feb. 22, 2005

(54) OPTICALLY BAFFLED SOLDER SLEEVE HEATING STATION

(75) Inventors: David S. Wright, Shoreline, WA (US); Guy N. Middleton, Everett, WA (US)

(73) Assignee: The Boeing Company, Chicago, IL (US)

( * ) Notice: Subject to any disclaimer, the term of this patent is extended or adjusted under 35 U.S.C. 154(b) by 152 days.

(21) Appl. No.: 10/346,347

(22) Filed: Jan. 15, 2003

(65) Prior Publication Data

US 2004/0134973 A1 Jul. 15, 2004

(51) Int. Cl.[7] .......................... B23K 31/02; B23K 37/00
(52) U.S. Cl. ...................... 228/4.5; 219/85.12; 392/419
(58) Field of Search ............... 228/4.5, 180.5, 228/246, 248.1, 248.5; 219/85.12, 85.13, 383, 385, 418, 419, 521; 392/405, 411, 416, 418, 419

(56) References Cited

U.S. PATENT DOCUMENTS

| | | | | |
|---|---|---|---|---|
| RE13,219 E | * | 3/1911 | Chapman | 228/56.3 |
| 3,451,609 A | * | 6/1969 | Gillett | 228/56.3 |
| 3,654,429 A | * | 4/1972 | Strachan | 392/409 |
| 4,151,364 A | * | 4/1979 | Ellis | 174/84 C |
| 4,685,780 A | * | 8/1987 | Kimura | 359/851 |
| 5,189,271 A | * | 2/1993 | Derbyshire | 219/633 |
| 5,430,816 A | * | 7/1995 | Furuya et al. | 385/33 |
| 5,944,567 A | * | 8/1999 | Ratajczak et al. | 439/874 |
| 5,952,071 A | * | 9/1999 | Rijsdijk et al. | 428/58 |
| 6,570,140 B2 | * | 5/2003 | Karacsony et al. | 219/521 |

* cited by examiner

*Primary Examiner*—Jonathan Johnson
(74) *Attorney, Agent, or Firm*—Shimokaji & Associates, P.C.

(57) ABSTRACT

An optically baffled heating station for joining wire connections by using a solder sleeve includes: an outer housing; a reflection block where said reflection block includes a reflection chamber where the reflection chamber forms the shape of two overlapping ellipses where the ellipses intersect at one respective focal point of each ellipsis and the opposing non-intersecting focal points are separated by about a 90° angle; two heating elements within a heating element block where the two heating elements extend beyond the heating element block and protrude into the reflection pockets of the reflection chamber. A slot extends between the two heating elements through the reflection block and the heating element block. The closed end of the slot includes a target area where the shrinking of the sleeve occurs. The target area receives the reflected light and minimizes the reflection of light toward the open end of the slot.

22 Claims, 8 Drawing Sheets

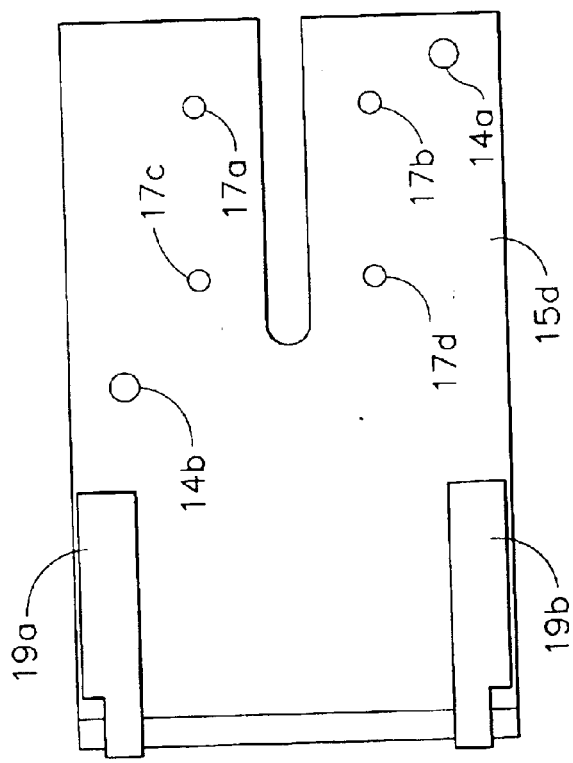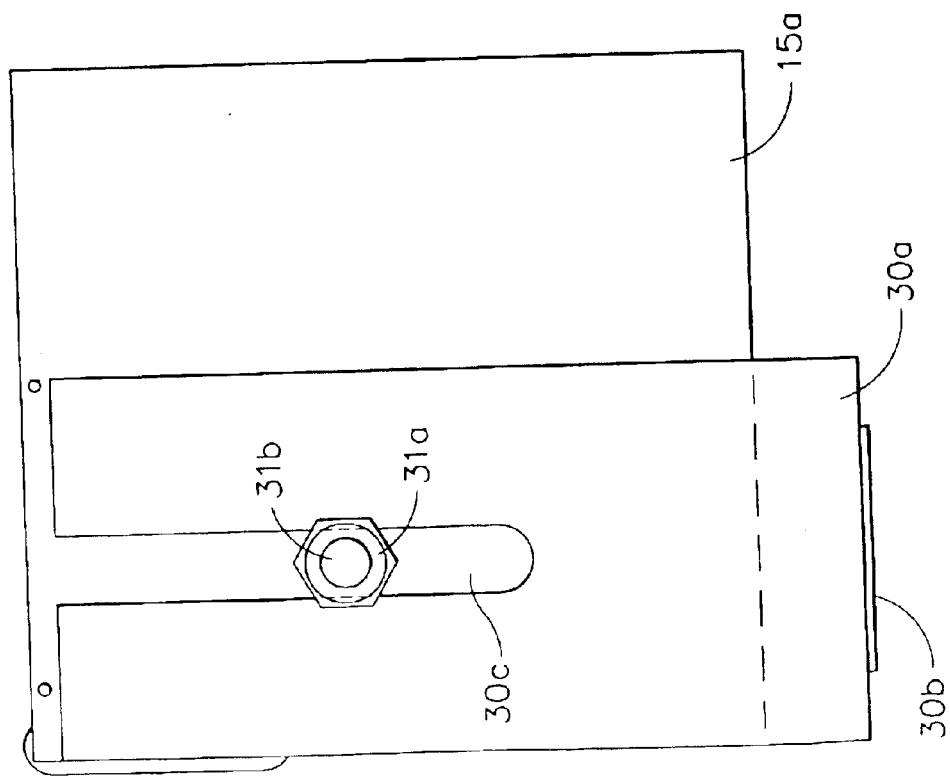

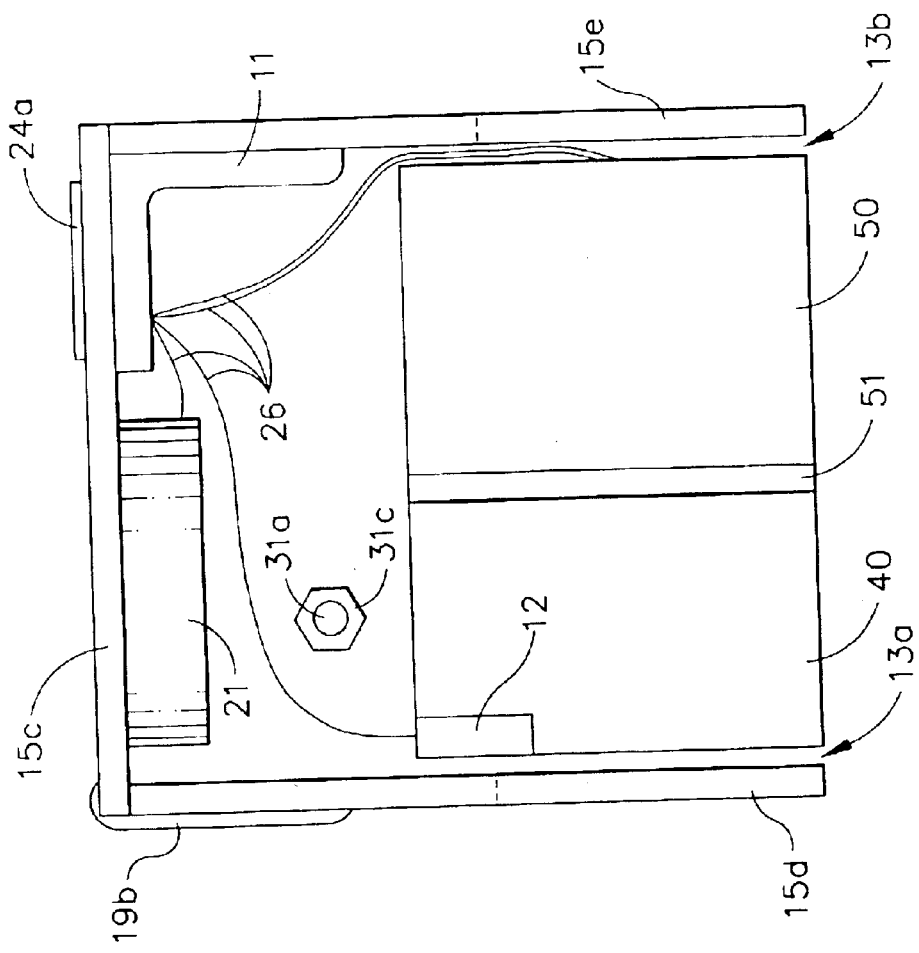
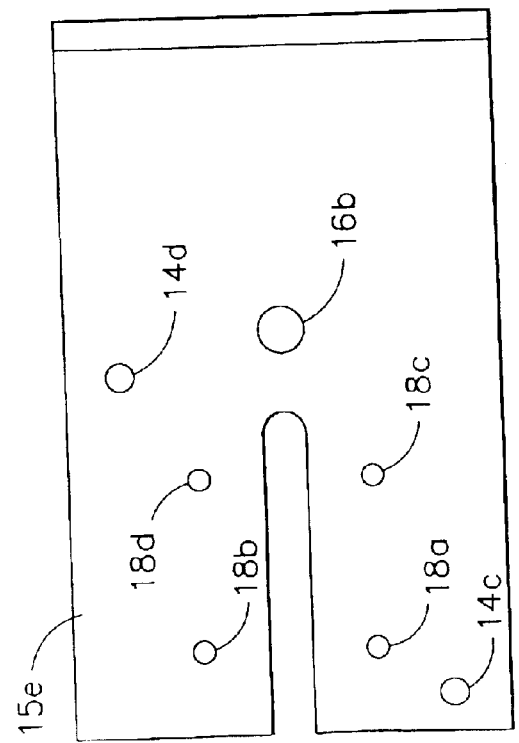
FIG. 3A
FIG. 2D

OPTICALLY BAFFLED SOLDER SLEEVE HEATING STATION

BACKGROUND OF THE INVENTION

The present invention generally relates to apparatus and methods for a solder sleeve heating station and more specifically, to apparatus and methods for a solder sleeve heating station which optically baffles light in order to effect the shrinking of a solder sleeve.

Presently, numerous devices and methods are used to seal wire splices. Wire splicing involves the connection of wires which have been stripped of insulation. The most commonly used method of joining stripped wires involves the insertion of the wires into a solder sleeve, applying heat to the solder sleeve which shrinks the sleeve and completes the splicing of the wires. In order to properly complete splicing, an operator must center the solder sleeve over the area to be spliced. The operator also must ensure the sleeve is melted and flowed over the wire insulation. Occasionally, the operator must reapply heat in order to complete the shrinking of the sleeve, however the operator must also avoid overheating the sleeve because overheating prevents the ability to perform any visual inspections of the sleeve. The splicing is further complicated by safety goggles which the operator must wear in order to avoid eye injuries that may be caused by the tool used to shrink the solder sleeve.

Tools used to heat the solder sleeve include both hand held and bench top devices. As stated above, the operator must do a number of hand manipulations in order to ensure proper assembly and heating of the solder sleeve. Using a handheld infrared heating tool requires even further manipulation by the operator. Infrared heating tools are also available in desktop versions which use an infrared ray for heating. The infrared heating tools normally require multiple filters to protect the operator from potential eye injuries in addition to personal protection such as eye goggles. Radiant heat tools are also available, however the radiant heat tools tend to be expensive to purchase and/or manufacture. The radiant heating device may also be costly to operate and maintain. Another common problem associated with each tool for shrinking involves the operation cycle. The shrinking of a sleeve typically takes 8–12 seconds and may be longer due to the inspection requirements associated with current devices and methods.

As can be seen, there is a need for an improved apparatus and method for shrinking solder sleeves which requires fewer hand manipulations by the operator, reduce safety hazards, require fewer components for the heating tools and involve a less expensive and more time efficient device. More particularly, it would be advantageous to use an optically baffled solder sleeve heating station which allows the operator to observe the heating process without the use of personal safety protection, reduces the hand manipulations required by the operator, performs the shrinking operation in less time, uses fewer components and is less costly to manufacture.

SUMMARY OF THE INVENTION

In one aspect of the present invention, a heating station for joining wire connections comprises: a reflection chamber; at least two heating elements, where the at least two heating elements extend into the reflection chamber and emit light into the reflection chamber; a slot which has an open end and a closed end, where the slot extends through the reflection chamber, where the closed end terminates within the reflection chamber and between the at least two heating elements; and a target area where the target area is positioned at the closed end of the slot, where joining of the at least one wire connection takes place within the target area, where the at least two heating elements are positioned in relation to the target area in order to direct the reflected light into the target area and minimize the reflection of light to the open end of the slot.

In another aspect of the present invention, a heating station for joining wire connections comprises: a reflection chamber; two heating elements, where the two heating elements extend into the reflection chamber and emit light into the reflection chamber; a slot which has an open end and a closed end, where the slot extends through the reflection chamber, where the closed end terminates within the reflection chamber and between the two heating elements; and a target area where the target area is positioned at the closed end of the slot, where joining of the at least one wire connection takes place within the target area, where the two heating elements are positioned in relation to the target area in order to direct the reflected light into the target area and minimize the reflection of light to the open end.

In another aspect of the present invention, a heating station for joining wire connections comprise: a reflection chamber where the reflection chamber forms the shape of two overlapping ellipses, where the ellipses intersect at one respective focal point of each ellipsis and the opposing non-intersecting focal points are separated by about 90° of separation; two heating elements, where the two heating elements extend into the reflection chamber and emit light into the reflection chamber; and a target area where the target area is positioned at the intersection of the overlapping ellipses, where joining of the at least one wire connection takes place within the target area, where the two heating elements are positioned in relation to the target area in order to direct the reflected light into the target area and minimize the reflection of light to the open end.

In another aspect of the present invention, a heating station for joining wire connections comprise: an outer housing; a reflection compartment where said reflection compartment includes a reflection chamber where the reflection chamber forms the shape of two overlapping ellipses where the ellipses intersect at one respective focal point of each ellipsis and about 90° of separation lies between the non-intersecting focal points, where the reflection compartment attaches to a first side panel of the outer housing, and where the reflection chamber includes two reflection pockets, where the two reflection pockets are centered over the opposing non-intersecting focal points of the ellipses; a heating element compartment where the heating element compartment includes two heating elements, where the heating element compartment attaches to a second side panel of the outer housing, where the two heating elements extend beyond the heating element compartment and protrude into the reflection pockets of the reflection chamber; a slot which has an open end and a closed end, where the closed end terminates within the reflection chamber, where the closed end includes a black non-reflective surface and where the slot extends between the two heating elements through the reflection compartment, the heating element compartment, the first side panel and second side panel; and a target area where the target area is positioned at the closed end of the slot, where joining of the at least one wire connection takes place within the target area, where the target area is centered over the overlapping focal points of the overlapping ellipses and the two heating elements are positioned in relation to the target area in order to direct the reflected light into the target area and minimize the reflection of light to the open end.

In another aspect of the present invention, a method of shrinking a solder sleeve for joining wire connections comprises: placing 90° of separation between two heating elements; positioning a target area at the focal point of the 90° angle; positioning the solder sleeve in a target area; emitting light from the two heating elements; reflecting the light into the target area; isolating the reflected light in the target area; and shrinking the solder sleeve due to heat generated by the reflected light in the target area.

In another aspect of the present invention, a method of splicing two wires comprises: inserting two wires into a solder sleeve; placing the solder sleeve into a target area; emitting light into the target area from two heating elements; reflecting the light in the target area; isolating the reflected light in the target area; and shrinking the solder sleeve due to heat generated by the reflected light in the target area.

These and other features, aspects and advantages of the present invention will become better understood with reference to the following drawings, description and claims.

BRIEF DESCRIPTION OF THE DRAWINGS

FIG. 2b shows an exemplary rear panel of the heating station according to an embodiment of the present invention;

FIG. 2c shows an exemplary side hinge panel of the heating station according to an embodiment of the present invention;

FIG. 2d shows an exemplary side panel of the heating station according to an embodiment of the present invention;

FIG. 3a shows an internal view of a heating station according to an embodiment of the present invention;

DETAILED DESCRIPTION OF THE INVENTION

Figure 1:
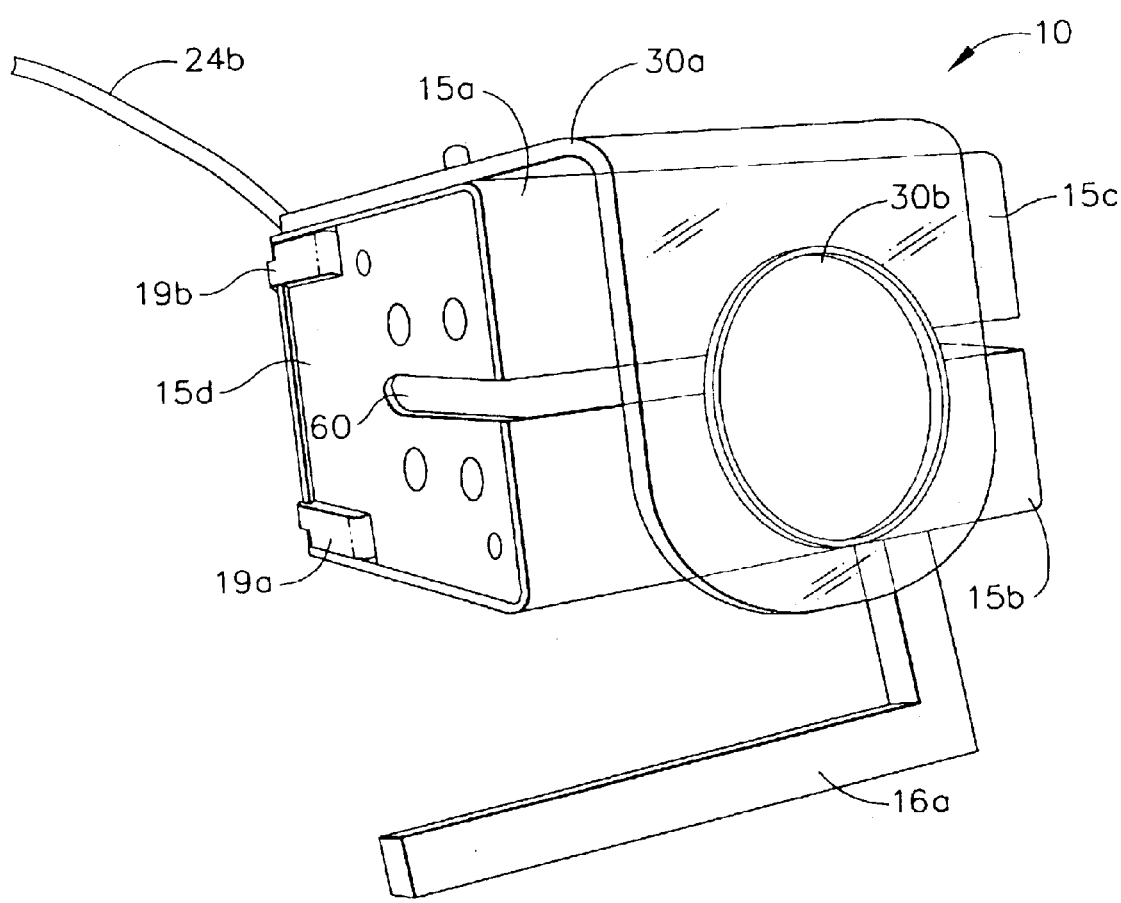
FIG. 1 shows a perspective view of an exemplary embodiment of a heating station according to the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides an optically baffled solder sleeve heating station (OBHS) that joins wire connections by applying focused light to a solder sleeve. The OBHS provides an alternative to infrared and radiant heating devices which addresses the above problems associated with the prior art and provides a quicker, safer and more efficient shrinking operation. The OBHS substantially reduces the operation cycle associated with the shrinking of solder sleeves, reduces the necessity of operator manipulation and reduces the hazards associated with this process. The operation cycle of the prior art tends to be in the range of 8–12 seconds as opposed to a 3 second cycle for the OBHS. Normally, an operator using the prior art for the shrinking operations must center or manipulate the position of the solder sleeve to ensure a proper joining of the wire connections. The OBHS allows an operator to simply insert the solder sleeve at the operation point of the OBHS without any further manipulation. The OBHS uses a focused light that remains contained within the OBHS and thus eliminates the need for multiple filters or personal protection in order to prevent operator injuries. The OBHS uses at least two heating elements which provide direct heat to the solder sleeve and consequently shrinks the sleeve which splices wires for use in multiple of applications. The OBHS includes optical baffles to shield the operator from light emitted from the heating elements. The OBHS allows an operator to insert the wires and solder sleeve into a slot, which activates a limit switch that turns on the heating elements. The heating elements emit light which is reflected within a reflection chamber and remains within the slot. The operator can view the soldering process through a filter that eliminates any light that may inadvertently come through the slot. The OBHS, however, due to its design reflects the light within the optical baffle and the slot is strategically coated to limit or eliminate any reflection light through the slot toward the operator. The reflection chamber of the OBHS is configured in the shape of two overlapping ellipses where the ellipses share one focal point and the respective unshared focal points are separated by about 90° separation. The design of the OBHS enables the reflection of the light emitted by the heating elements which causes the generation of sufficient heat to shrink the solder sleeve, but substantially eliminates the emission of light outside the slot. The OBHS shrinks the solder sleeve in a substantially less time period, about a 3 second operation, than associated with the prior art devices, typically an 8–12 second operation, and reduces operator exposure to eye injury as discussed above. Many of the prior art infrared heating tools require multiple filters in order to filter the infrared light used, however the OBHS does not require multiple filters because it does not use infrared light and the light remains contained within the OBHS.

Referring to FIG. 1, a perspective view of an exemplary embodiment of a heating station according to the present invention is shown. The OBHS 10 includes a filter mount 30a which is attached to a rear panel 15a. The rear panel 15a is L-shaped and encloses the rear portion of the OBHS 10. A front panel 15b, also L-shaped, encloses the front portion of the OBHS 10. The filter mount 30a includes at least a pair of polarizing filters 30b which are centered over an insertion slot 60 during operation. The polarizing filters 30b provide further protection from light that may emit through the insertion slot 60 toward the operator. As will be discussed below, any light that may escape through the insertion slot 60 will be unfocused and thus the operator will not need any additional protection while operating the OBHS 10. A side hinge panel 15d and side panel 15e provide the other enclosing sides of the OBHS 10. The side hinge panel 15d includes a first hinge 19a and second hinge 19b which allow for the opening and closing of the OBHS 10. Power supply cord 24b supplies electrical power to the OBHS 10 and stand 16a which is attached to side panel 15e provides a device to adjust and support the position of the OBHS 10.

Figure 2A:
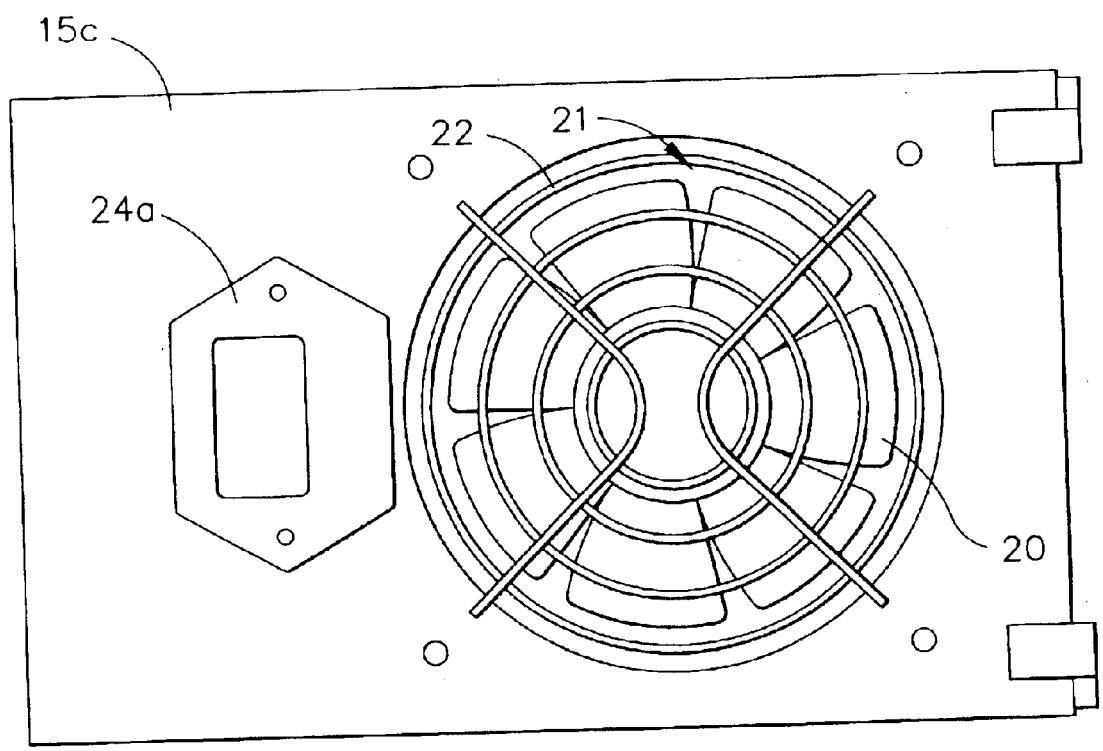
FIG. 2a shows an exemplary bottom panel of the heating station according to an embodiment of the present invention.

Referring now to FIG. 2a, an exemplary bottom panel of the heating station according to the present invention is shown. The bottom panel 15c includes a power supply connection 24a that accommodates power supply cord 24b shown in FIG. 1, fan vent 21, a fan 20 and fan cover 22. The fan 20 draws hot air from the interior of the OBHS 10 and prevents heat transfer to the outer surface of the OBHS 10. The OBHS 10 uses 120 volts of power that supplies voltage to the fan 20 and to the other internal components that are described below.

Referring now to FIG. 2b, an exemplary rear panel of the heating station according to the present invention is shown. The rear panel 15a includes an orifice which receives a panel bolt 31a. The panel bolt 31a provides a device for attaching and allowing the adjustment of filter mount 30a. The panel bolt 31a includes threads which receive a panel nut 31b which firmly attaches the filter mount 30a to the rear panel 15a. The filter mount 30a includes a slot 30c which allows for the vertical adjustment of the polarizing filters 30b as shown in FIG. 1.

Referring now to FIG. 2c, an exemplary side hinge panel of the heating station according to the present invention is shown. As described in FIG. 1, side hinge panel 15d includes a first hinge 19a and a second hinge 19b which both provide for opening the OBHS 10 for inspection of the reflection chamber and heating elements that will be described in detail below. Four bolts, a first reflector bolt 17a, a second reflector bolt 17b, a third reflector bolt 17c and a fourth reflector bolt 17d, are inserted through openings in the side hinge panel 15d that allow for the attachment of a reflector block 40, shown in FIG. 3a, to the side hinge panel 15d. Two openings, a first closure hole 14a and a second closure hole 14b allow for the insertion of bolts which connect the side hinge panel 15d and side panel 15e and connect the internal components of the OBHS 10.

Referring now to FIG. 2d, an exemplary side panel of the heating station according to the present invention is shown. Side panel 15e includes four bolts, a first HL bolt 18a, a second HL bolt 18b, a third HL bolt 18c and a fourth HL bolt 18d, are inserted through openings in the side panel 15e that allow for the attachment of a HL block 50, shown in FIG. 3a, to the side panel 15e. Two openings, a third closure hole 14c and a forth closure hole 14d allow for the insertion of bolts which connect the side hinge panel 15d and side panel 15e and connect the internal components of the OBHS 10. The side panel 15e also includes a stand bolt 16a that allows for the attachment of the stand 16a shown in FIG. 1.

Figure 3B:
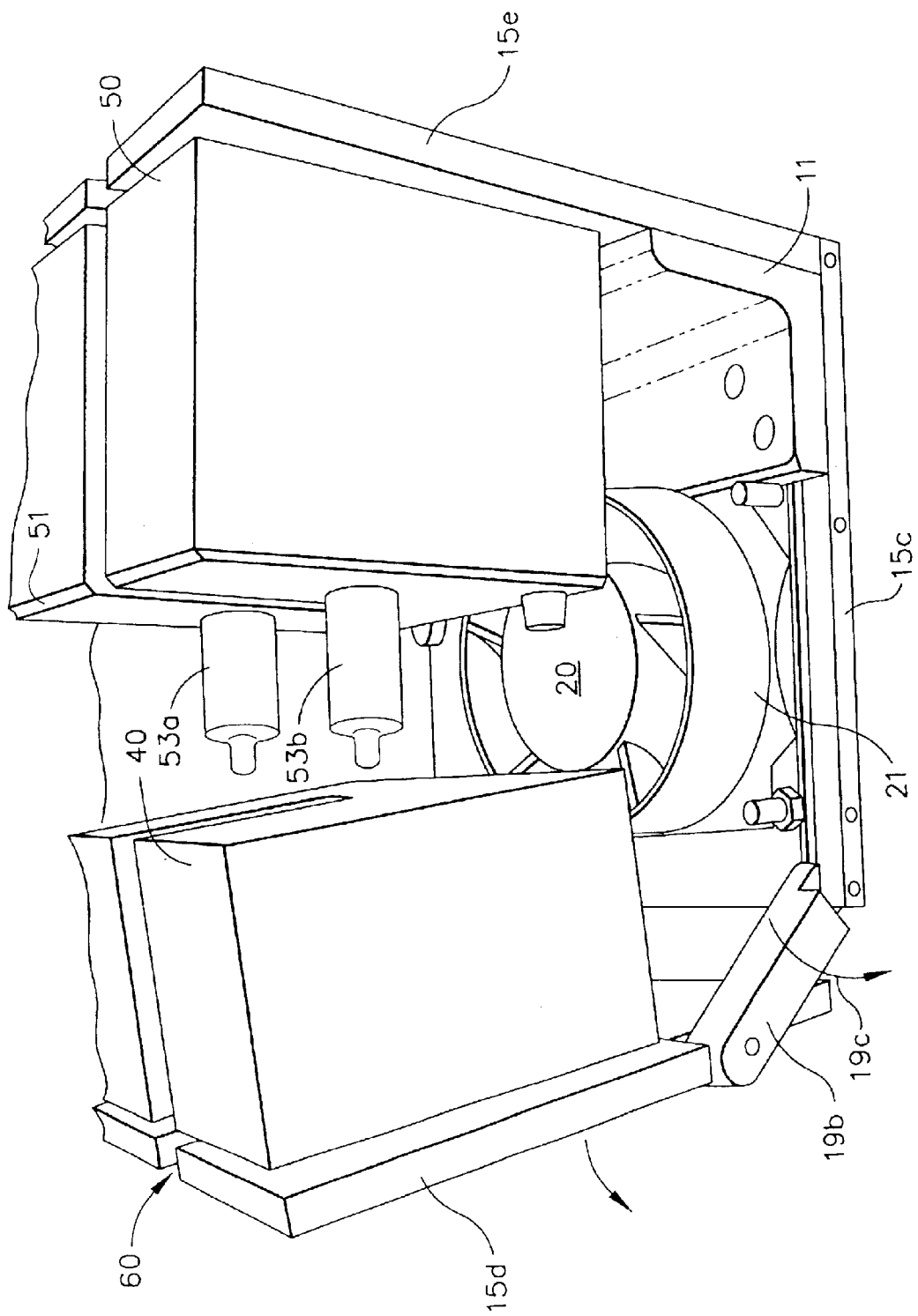
FIG. 3b shows a second exemplary internal view of a heating station according to an embodiment of the present invention.

Referring now to FIG. 3a, an exemplary internal view of the heating station according to the present invention is shown. The front panel 15b is removed from the OBHS 10 in order to show the internal components. A reflector block 40 abuts HL block 50 in the center of the OBHS 10. A cover plate 51 separates the HL block 50 from the reflector block 40. The reflector block 40 includes a limit switch 12 which serves to activate heating elements during operation. Reflector gap 13a and HL gap 13b are shown between the side hinge panel 15d and side panel 15e respectively. The gaps allow for the movement of air between the reflector block 40 and HL block 50 and thus allows for heat transfer out of the OBHS 10 during operation. Other components shown within the OBHS 10 include the fan vent 21, a corner bracket 11 which provides support for the side panel 15c and internal wiring 26. The internal wiring 26 provide power to the fan 20, limit switch 12 and heating elements of the HL block 50. The panel bolt 31a is also shown with a second panel bolt 31c that allows for the optional attachment of the filter mount 30a to the front panel 15b in another exemplary embodiment of the present invention. The second hinge 19b is also shown and enables the lateral movement of side hinge panel 15d as described below in FIG. 3b.

Referring now to FIG. 3b, a second exemplary internal view of the heating station according to the present invention is shown. The side hinge panel 15d may be rotated laterally and in a counterclockwise direction (see the arrow 19c), which enables the operator to completely open the OBHS 10. The design of the side hinge panel 15d enables the operator to inspect the interior of the reflector block 40 and to replace and/or inspect the heating elements, first heating element 53a and second heating element 53b. FIG. 3b also shows the insertion slot 60 and the back side of fan 20. The other components of FIG. 3b were also shown in FIG. 3a and described above.

Figure 4A:
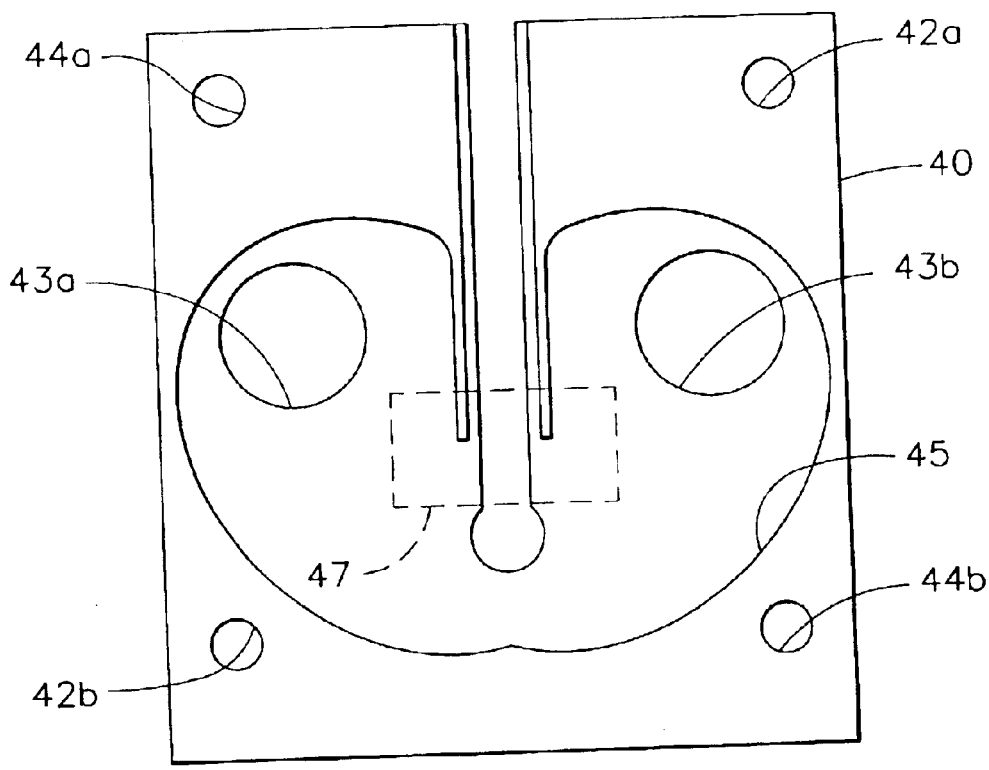
FIG. 4a shows a front view of an exemplary reflector block according to an embodiment of the present invention.

Referring now to FIG. 4a, a front view of an exemplary reflector block according to the present invention is shown. The reflector block 40 includes a reflection chamber 45 that reflects the light emitted by heating elements 53a, 53b. The surface of the reflection chamber 45 focuses the light into a reflection target area 47. The shape of the reflection chamber 45 enables the optical baffling of the light to the reflection target area 47 which causes the generation of heat sufficient to shrink the inserted solder sleeve in about three seconds. The reflection chamber also eliminates the necessity of any further manipulation by the operator once the solder sleeve is placed in the target area 47. The optical baffling also contains the light within the reflection chamber 45 and all focused light is directed toward the target area 47. The reflection chamber 45 includes a first HL pocket 43a and a second HL pocket 43b. The HL pockets 43a, 43b receive a portion of heating elements 53a, 53b when the OBHS 10 is closed as shown in FIG. 3a. The reflection block 40 also includes a top cavity 42a, a bottom cavity 42b, a top bolt thruway 44a and a bottom bolt thruway 44b. The top cavity 42a and bottom cavity 42b receive alignment pins which protrude from the HL block 50. The top bolt thruway 44a and bottom bolt thruway 44b provide openings for the insertion of connection bolts which join the side hinge panel 15d and side panel 15e and vertically connect the internal components of the OBHS 10.

Figure 4B:
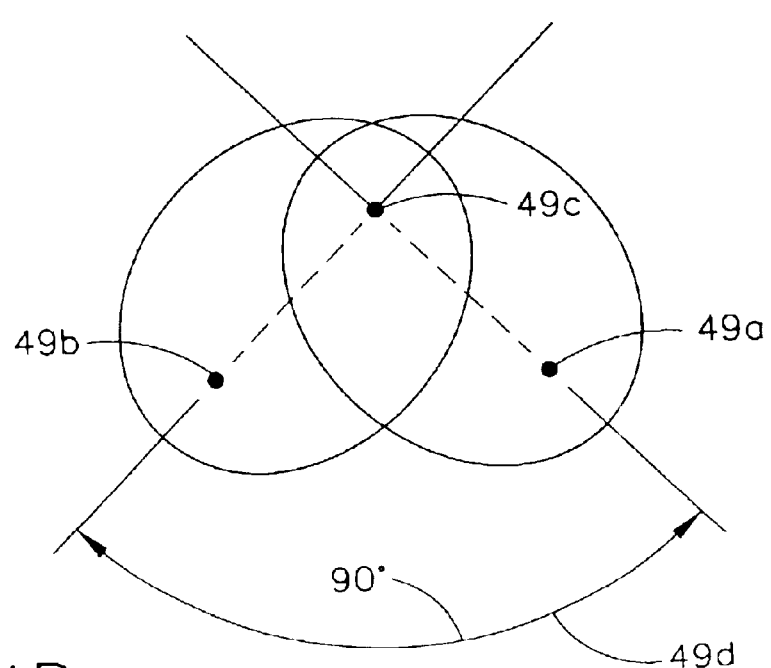
FIG. 4b shows an exemplary configuration for the reflector pockets according to an embodiment of the present invention.

Referring now to FIG. 4b, an exemplary configuration for the reflector pockets according to the present invention is shown. A first focal point 49a represents the center of the first HL pocket 43a, a second focal point 49b represents the center of the second HL pocket 43b and a third focal point 49c represents the center of target area 47. The outside circumference of the overlapping ellipses correlate to the outside surface of the reflection chamber 45. The exemplary embodiment of FIG. 4b shows a separation angle 49d which provides 90° of separation between the first focal point 49a and second focal point 49b. The shape of the reflection chamber 45 correlates with the elliptical configuration of FIG. 4b and effectively enables the optically baffling of the light emitted by the heating elements 53a, 53b.

Figure 4C:
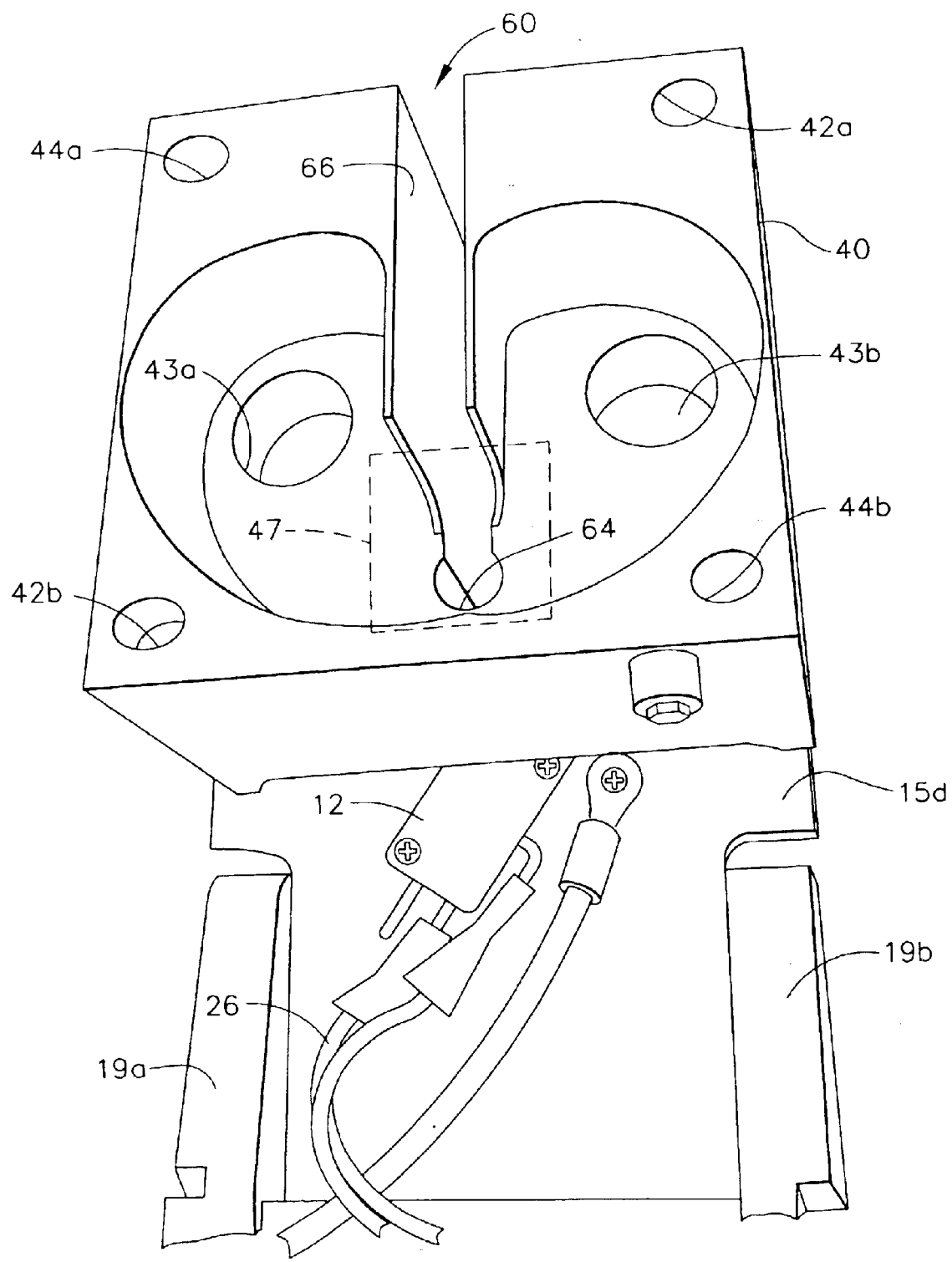
FIG. 4c shows a perspective view of an exemplary reflector block according to an embodiment of the present invention.

Referring now to FIG. 4c, a perspective view of an exemplary reflector block according to the present invention is shown. FIG. 4c depicts a number of the components associated with the reflector block 40 and side hinge panel 15d as described above. FIG. 4c provides a clearer view of the target area 47 and shows non-reflective walls 66 of insertion slot 60 which actually end just before the target area 47. The non-reflective walls 66 are coated with light absorbing material to reduce the amount of light transmitted toward the operator. This embodiment enables the direct application of heat to the target solder sleeve. A chamber non-reflective area 64 receives a coating to prevent the reflection of focused light through the insertion slot 60. The non-reflective walls 66 also receive a coating to prevent the reflection of light through the insertion slot 60. The coating could be any known means to reduce light reflection such as application of black paint or black colored strips. The depth of the slot, narrow opening and light absorbing material all contribute to the optical baffling system.

Figure 5:
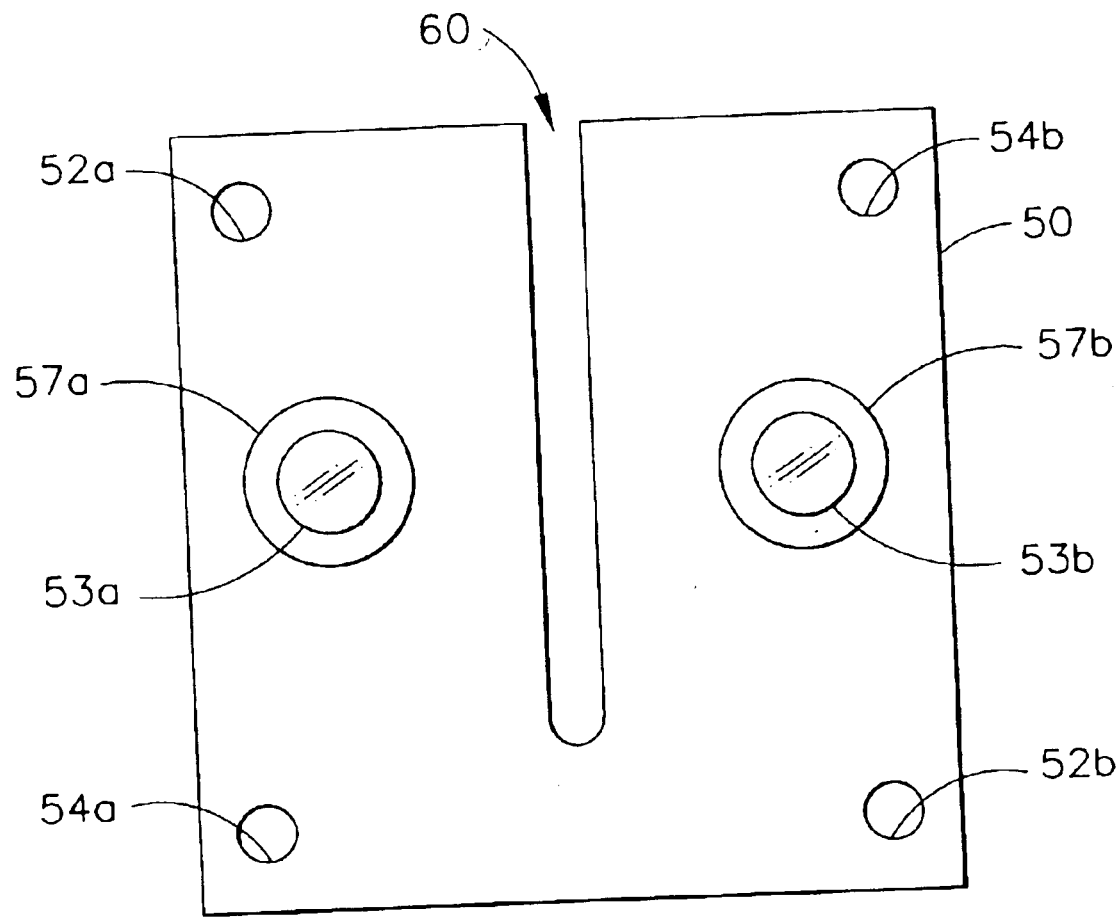
FIG. 5 shows a front view of an exemplary heating element (HL) block according to an embodiment of the present invention.

Referring now to FIG. 5, a front view of an exemplary HL block according to the present invention is shown. The HL block 50 includes a top alignment pin 52a and a bottom alignment pin 52b which protrude into the top cavity 42a and bottom cavity 42b of the reflection block 40 when the blocks are joined during operation. A bottom HL bolt thruway 54a and a top HL bolt thruway 54b are also shown which provide openings for the insertion of connection bolts that join the side hinge panel 15d and side panel 15e and vertically connect the internal components of the OBHS 10. A first HL cavity 57a and second HL cavity 57b respectively receive the first heating element 53a and second heating element 53b. The heating elements, 53a, 53b protrude out of the cavities 57a, 57b and extend into the HL pockets 43a, 43b of the reflector block 40. The heating elements 53a, 53b emit light into the reflection chamber 45 as described above and may be any device capable of emitting light to sufficiently generate enough heat for the shrinking of the solder sleeve. Any light emitting bulbs may be used as heating elements, 53a, 53b and halogen bulbs may be used in one exemplary embodiment of the present invention. The halogen bulbs may be 500 watts each, however the exact wattage may vary depending on application and operational goals. The cover plate 51, shown in FIG. 3a, covers the HL block 50 and provides protection from the heat of the reflection chamber 45.

It should be understood, of course, that the foregoing relates to preferred embodiments of the invention and that modifications may be made without departing from the spirit and scope of the invention as set forth in the following claims.

We claim:

1. A heating station for joining wire connections comprising:
   a reflection chamber;
   at least two heating elements, where the at least two heating elements extend into the reflection chamber and emit light into the reflection chamber;
   a slot which has an open end and a closed end, where the slot extends through the reflection chamber, where the closed end terminates within the reflection chamber and between the at least two heating elements; and
   a target area where the target area is positioned at the closed end of the slot, where joining of the at least one wire connection takes place within the target area, where the at least two heating elements are positioned in relation to the target area in order to direct reflected light into the target area and minimize the reflection of light to the open end of the slot.

2. The heating station according to claim 1, further comprising a reflection block which includes the reflection chamber.

3. The heating station according to claim 2, wherein the reflection chamber forms the shape of two overlapping ellipses.

4. The heating station according to claim 3, where each ellipse includes two respective focal points, where the ellipses intersect at one respective focal point of each ellipse and about 90° of separation lies between the non-intersecting focal points.

5. The heating station according to claim 4, where the reflection chamber includes two reflection pockets.

6. The heating station according to claim 5, where the two reflection pockets are centered over the opposing non-intersecting focal points of the ellipses.

7. The heating station according to claim 6, where the target area is centered over the overlapping focal points of the overlapping ellipses.

8. The heating station according to claim 1, further comprising:
   a pair of polarizing filters positioned over the open end of the slot.

9. The heating station according to claim 8, further comprising:
   a filter mount which includes the polarizing filters.

10. A heating station for joining wire connections comprising:
    a reflection chamber;
    two heating elements, where the two heating elements extend into the reflection chamber and emit light into the reflection chamber;
    a slot which has an open end and a closed end, where the slot extends through the reflection chamber, where the closed end terminates within the reflection chamber and between the two heating elements; and
    a target area where the target area is positioned at the closed end of the slot, where joining of the at least one wire connection takes place within the target area, where the two heating elements are positioned in relation to the target area in order to direct reflected light into the target area and minimize the reflection of light to the open end.

11. The heating station according to claim 10, further comprising:
    a reflection block which includes the reflection chamber, wherein the reflection chamber forms the shape of two overlapping ellipses, where the reflection block is attached to an outer housing.

12. The heating station according to claim 11, where each ellipse includes two respective focal points, where the ellipses intersect at one respective focal point of each ellipse and about 90° of separation lies between the non-intersecting focal points.

13. The heating station according to claim 12, where the reflection chamber includes two reflection pockets where the two reflection pockets are centered over the opposing non-intersecting focal points of the ellipses and the reflection chamber focuses the reflected light into the target area.

14. The heating station according to claim 13, where the target area is centered over the overlapping focal points of the overlapping ellipses.

15. The heating station according to claim 10, further comprising:
    a pair of polarizing filters positioned over the open end of the slot; and
    a filter mount which includes the polarizing filters.

16. A heating station for joining wire connections comprising:
    a reflection chamber where the reflection chamber forms the shape of two overlapping ellipses, where each ellipsis includes two respective focal points, where the ellipses intersect at one respective focal point of each ellipsis and about 90° of separation lies between the non-intersecting focal points;
    two heating elements, where the two heating elements extend into the reflection chamber and emit light into the reflection chamber; and a target area where the target area is positioned at the intersection of the overlapping ellipses, where joining of the at least one wire connection takes place within the target area, where the two heating elements are positioned in relation to the target area in order to direct reflected light into the target area and minimize the reflection of light to the open end.

17. The heating station according to claim 16, further comprising:
a reflection block which includes the reflection chamber, where the reflection chamber includes two reflection pockets and enables an optical baffling of the reflected light in the target area.

18. The heating station according to claim 17, where the optical baffling contains the reflected light within the reflection chamber and reflected light is directed toward the target area.

19. The heating station according to claim 17, where the two reflection pockets are centered over the non-intersecting focal points of the ellipses and a portion of each of the two heating elements protrude into the reflection pockets.

20. The heating station according to claim 16, further comprising:
a slot which has an open end and a closed end, where the closed end terminates within the reflection chamber, where the slot is coated with a light absorbing material.

21. The heating station according to claim 20, where the closed end includes a non-reflective surface.

22. A heating station for joining wire connections comprising:
an outer housing;
a reflection block where said reflection block includes a reflection chamber where the reflection chamber forms the shape of two overlapping ellipses, where each ellipsis includes two respective focal points, where the ellipses intersect at one respective focal point of each ellipse and about 90° of separation lies between the non-intersecting focal points, where the reflection block attaches to a first side panel of the outer housing, and where the reflection chamber includes two reflection pockets, where the two reflection pockets are centered over the opposing non-intersecting focal points of the ellipses;
a heating element block where said heating element block includes two heating elements, where the heating element block attaches to a second side panel of the outer housing, where the two heating elements extend beyond the heating element block and protrude into the reflection pockets of the reflection chamber;
a slot which has an open end and a closed end, where the closed end terminates within the reflection chamber, where the closed end includes a black non-reflective surface and where the slot extends between the two heating elements through the reflection block, the heating element block, the first side panel and second side panel; and
a target area where the target area is positioned at the closed end of the slot, where joining of the at least one wire connection takes place within the target area, where the target area is centered over the overlapping focal points of the overlapping ellipses and the two heating elements are positioned in relation to the target area in order to direct reflected light into the target area and minimize the reflection of light to the open end.

* * * * *